United States Patent
Scheuer et al.

(10) Patent No.: US 9,647,438 B2
(45) Date of Patent: May 9, 2017

(54) SEALING GROMMET ASSEMBLY WITH INTEGRAL WIRE CHANNEL

(71) Applicant: GM GLOBAL TECHNOLOGY OPERATIONS LLC, Detroit, MI (US)

(72) Inventors: David E. Scheuer, Washington Township, MI (US); Anthony J. Loiselle, Waterford, MI (US); Tim A Rossiter, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/876,891

(22) Filed: Oct. 7, 2015

(65) Prior Publication Data
US 2017/0104322 A1    Apr. 13, 2017

(51) Int. Cl.
| | |
|---|---|
| *H02G 15/013* | (2006.01) |
| *F16L 5/02* | (2006.01) |
| *H02G 3/04* | (2006.01) |
| *H02G 3/22* | (2006.01) |

(52) U.S. Cl.
CPC ............. *H02G 15/013* (2013.01); *F16L 5/02* (2013.01); *H02G 3/0487* (2013.01); *H02G 3/22* (2013.01)

(58) Field of Classification Search
CPC .............. B60R 16/0222; H02G 15/013; H02G 3/0487; H02G 3/22; F16L 5/02
USPC .......................................................... 174/650
See application file for complete search history.

(56) References Cited

U.S. PATENT DOCUMENTS

| | | | | |
|---|---|---|---|---|
| 4,656,689 A | * | 4/1987 | Dennis | F16L 5/027 16/2.2 |
| 5,337,447 A | * | 8/1994 | Tanaka | H02G 3/083 16/2.2 |
| 6,815,615 B1 | * | 11/2004 | Haulotte | B60R 16/0222 16/2.1 |

* cited by examiner

*Primary Examiner* — Timothy Thompson
*Assistant Examiner* — Michael F McAllister
(74) *Attorney, Agent, or Firm* — Quinn IP Law

(57) ABSTRACT

A sealing grommet assembly for use with a panel and a wire bundle includes first and second grommets, a cable guide, and an annular retainer. The first grommet defines a first conduit and a first set of sealing lips. The second grommet defines a second conduit and a second set of sealing lips. The cable guide is positioned within the first and second conduits, and receives and supports the wire bundle. The annular retainer is encapsulated by the first and second grommets, and has a first set of axially-projecting latch fingers that secures the first and second grommets to each other. The retainer also has a second set of axially-projecting latch fingers that secures the first and second grommets to the panel. The sealing lips form a seal against opposite sides of the panel when the sealing grommet assembly is secured to the panel via the annular retainer.

10 Claims, 4 Drawing Sheets

SEALING GROMMET ASSEMBLY WITH INTEGRAL WIRE CHANNEL

TECHNICAL FIELD

The present disclosure relates to a sealing grommet assembly having an integral wire channel.

BACKGROUND

Wire harnesses are used in complex systems to route bundles of wires between electrical components. For instance, in a typical vehicle the wires of an underhood wiring harness are strapped into separate wire bundles and routed through an opening in a firewall. The wire bundles are then connected to gauges, entertainment/navigation systems, power seats, or other electronic devices within a vehicle interior. A water-tight seal at the opening helps prevent leaks into the vehicle interior. One-piece sealing grommets in the form of hollow cylindrical inserts of rubber or a synthetic polymer material are typically used for this purpose. Sealing grommets may be radially flared and/or provided with an enlarged head so as to retain the grommet in an installed position with respect to the opening.

The electrical content in complex systems continues to increase. In some areas, a wiring harness must be routed through a restricted space, for example in an underhood compartment of a vehicle, between adjacent panels of an appliance, or through an exterior wall of a building. Bundled wires of a wiring harnesses can have a relatively large diameter, which in turn can make the wiring harness difficult to route between components within the restricted space. Moreover, once the wiring harness has been successfully routed through the panel opening, sufficient clearance must be maintained with respect to surrounding components, such as clutch, brake, and accelerator pedals of a vehicle interior. However, accurate and repeatable routing of relatively thick wire bundles of a wiring harness may be difficult to achieve using conventional cylindrical or flared sealing grommets.

SUMMARY

A sealing grommet assembly is disclosed herein for use with a wire bundle and a panel. In an example embodiment, the sealing grommet assembly includes first and second grommets, a cable guide, and an annular retainer. The first grommet defines a first conduit and a first set of sealing lips, i.e., panel-facing sealing surfaces. Similarly, the second grommet defines a second conduit and a second set of sealing lips. The cable guide, which is positioned within the first and second conduits, is configured to receive the wire bundle.

The annular retainer, which is encapsulated by or sandwiched between the first and second grommets, has first and second sets of axially-extending latch fingers. The first set of latch fingers is configured to secure the first and second grommets to each other. The second set of latch fingers secures the first and second grommets to the panel. The first and second sets of sealing lips, once the sealing grommet assembly has been installed with respect to the panel, provide a two-way water-tight seal against the panel by sealing from opposite sides of the panel.

The first and second grommets may be constructed of an elastic material such as ethylene propylene diene monomer (EPDM) rubber, which enables the first and second grommets to be stretched over the annular retainer and the cable guide during installation. The cable guide may be constructed of relatively hard molded material such as nylon or plastic, such that the cable guide supports and maintains a shape of the wire bundle as the wire bundle is routed through the sealing grommet assembly.

In an example configuration, a total of five sealing lips are provided, with the first set of sealing lips including three sealing lips and the second set of sealing lips including two sealing lips.

The cable guide may define a semicircular or arcuate wire channel, which is configured to receive the wire bundle and positioned within the second conduit of the second grommet. In such an embodiment, the second conduit may be cylindrical in shape.

The cable guide may include a housing positioned in the first conduit and configured to receive the wire bundle. In such an embodiment, the first conduit may be rectangular or box-shaped.

The first set of axially-extending latch fingers may include radially-extending latches, with the second grommet defining a plurality of recesses. Each of the recesses in this embodiment receives a different one of the radially-extending latches.

Each latch finger of the first set of axially-extending latch fingers may also have a U-shaped profile, which provides the first set of axially-extending latch fingers with a desired level of resiliency typical of a snap-lock. Each latch finger of the second set of axially-extending latch fingers may include a radially-extending latch that engages the panel. The radially-extending latches of the first and second sets of axially-extending latch fingers are oriented in opposite directions relative to each other.

The first and second sets of latch fingers may be alternatively and equally spaced around a perimeter of the annular retaining ring.

An assembly is also disclosed that includes a panel having first and second sides, a wire bundle extending between the first and second sides of the panel through the opening, and a sealing grommet assembly configured as noted above.

A method of installing a wire bundle with respect to a panel using the sealing grommet assembly includes feeding the wire bundle into the cable guide, and then feeding the wire bundle with cable guide into the second grommet. The method further includes inserting the first grommet and the annular retainer into an opening of the panel from a first side of the panel, securing the annular retainer and the first grommet via a first number of the plurality of axially-extending latch fingers, and securing the second grommet to the first grommet from a second side of the panel. Securing the second grommet includes latching the second grommet to the first grommet via a second number of the axially-extending latch fingers, such that the plurality of sealing lips fluid form a seal against the panel on the first and second sides of the panel.

The above features and advantages and other features and advantages of the present disclosure are readily apparent from the following detailed description of the best modes for carrying out the disclosure when taken in connection with the accompanying drawings.

DETAILED DESCRIPTION

Figure 1:
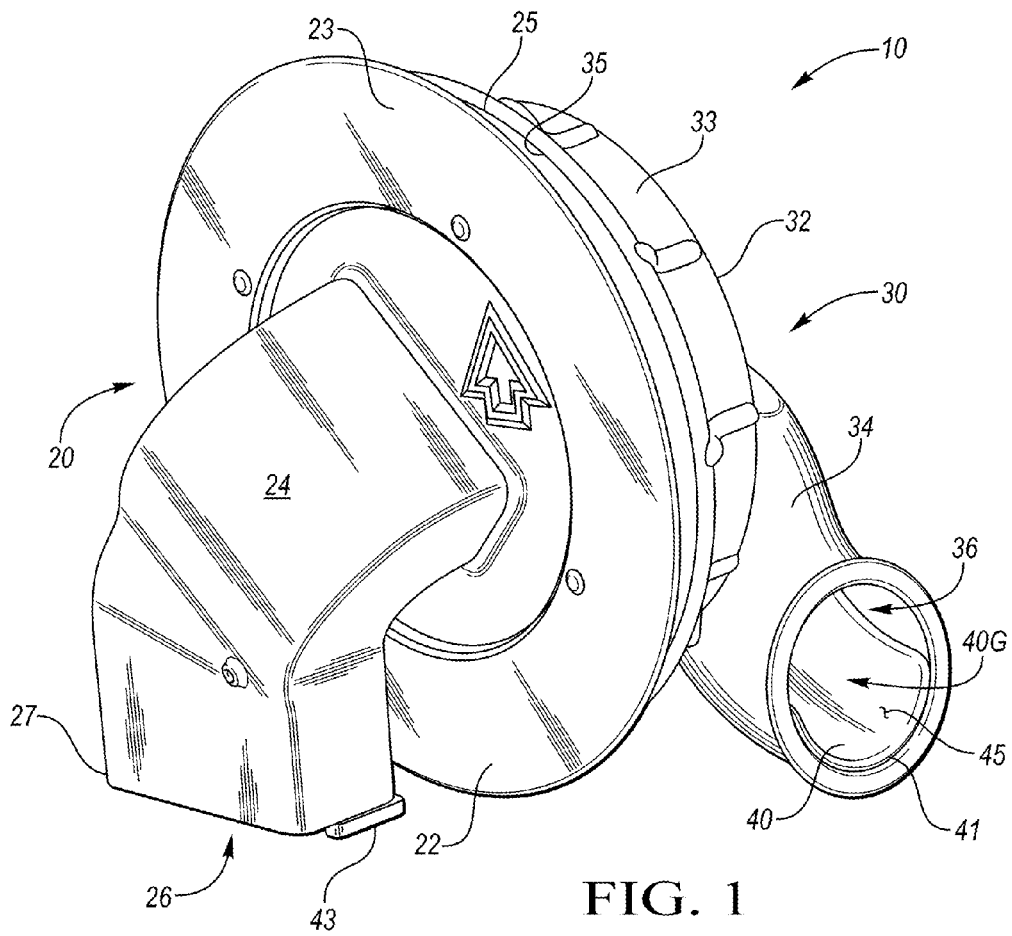
FIG. 1 is a schematic perspective view illustration of a sealing grommet assembly for use with a wire bundle and a panel as described herein.
Figure 1A:
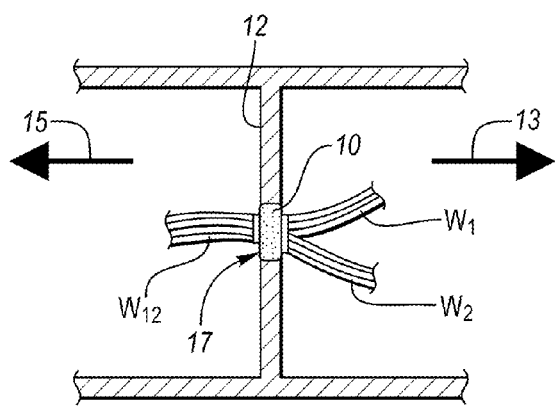
FIG. 1A is a schematic cross-sectional illustration of an example panel having an opening within which is disposed the sealing grommet assembly of FIG. 1.

Referring to the drawings, wherein like reference numbers refer to like components, a sealing grommet assembly 10 is depicted in FIG. 1 as it would appear in an assembled and installed position with respect to a panel 12 shown schematically in FIG. 1A. The panel 12 may be constructed of metal, composite, glass, or other materials, and may be used to divide a compartment or space into separate sides 13 and 15. In a non-limiting example automotive application, the panel 12 of FIG. 1A may be a firewall separating an engine compartment or underhood side of a vehicle body from an interior side, i.e., a passenger compartment or vehicle interior.

A wire bundle ($W_{12}$) of a wiring harness is routed through an opening (arrow 17) in the panel 12 so as to deliver electrical power from side 15 to various electrical components located on side 13, e.g., gauges within an instrument panel, power seats, entertainment or navigation systems, and the like. Other vehicular and non-vehicular applications requiring routing of bundled wires or electrical cables through an opening in other types of panels 12 may be readily envisioned within the intended scope of the present disclosure, such as but not limited to panels separating interior and exterior areas of a building or an appliance. For illustrative consistency, the panel 12 of FIG. 1 will be described hereinafter as a firewall in a vehicle without limiting the scope to such an application.

Figure 2:
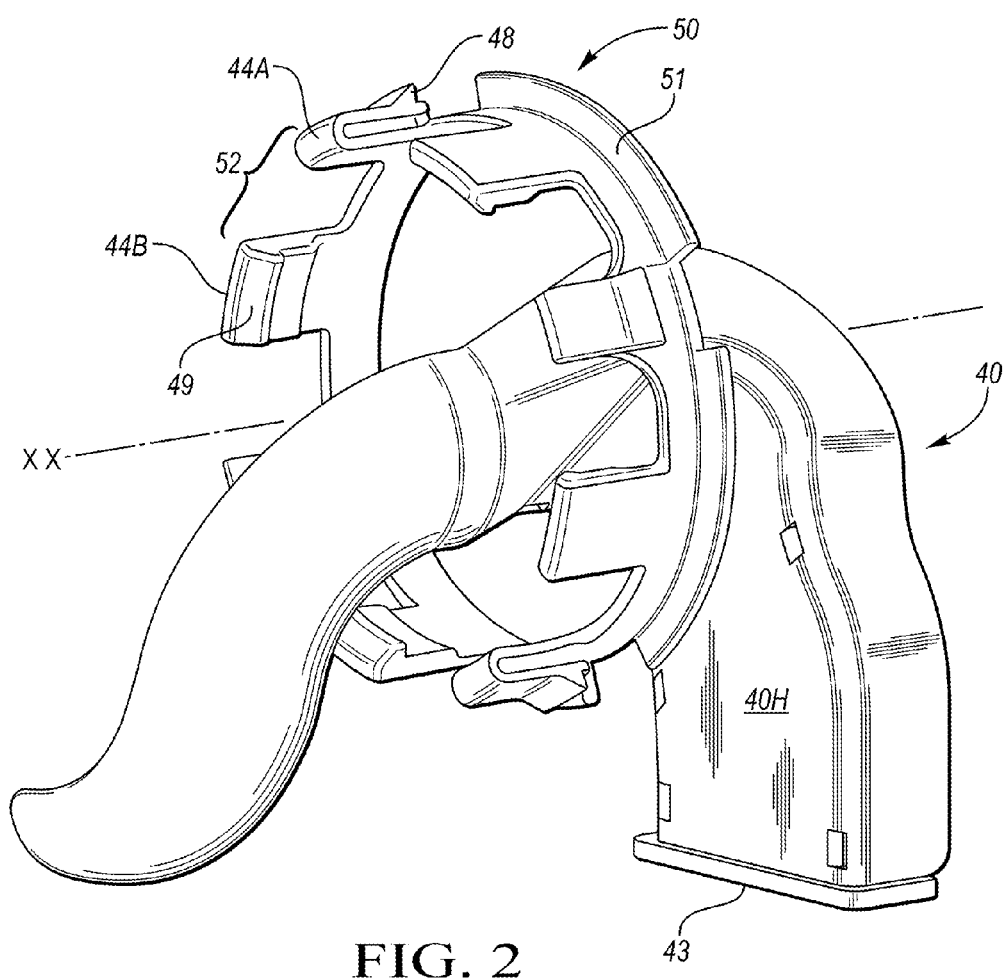
FIG. 2 is a schematic perspective view illustration of an integral wire channel and annular retaining ring of the sealing grommet assembly shown in FIG. 1.

The sealing grommet assembly 10 of FIG. 1 includes respective first and second grommets 20 and 30, a cable guide 40, and an annular retainer 50, the latter of which is best shown in FIG. 2 and described below. The first and second grommets 20, 30 are oppositely disposed with respect to each other on different sides 13 and 15 of the panel 12 of FIG. 1A. The first and second grommets 20 and 30 in the fully-assembled configuration of FIG. 1 together encapsulate the annular retainer 50 of FIG. 2 and substantially all of the structure of the cable guide 40. That is, the first and second grommets 20 and 30 fully surround the annular retainer 50 and the cable guide 40, with the exception of distal ends 41 and 43 of the cable guide 40 as explained below.

The annular retainer 50, as described below with reference to FIGS. 2 and 3, includes a plurality of axially-projecting latch fingers 52, i.e., tabs or extensions projecting parallel to a center axis XX of the annular retainer 50. The axially-projecting latch fingers 52 of the annular retainer 50 collectively operate to secure the respective first and second grommets 20 and 30 to each other while also securing the sealing grommet assembly 10 to the panel 12 proximate the opening (arrow 17 of FIG. 1A) through which the wire bundle (W) is inserted. The cable guide 40 enables the wire bundle (W) to be easily routed through the panel 12 while also maintaining the shape of the wire bundle (W). Moreover, the first and second grommets 20 and 30 are configured to seal the opening (arrow 17) from opposite sides 13 and 15 of the panel 12 as explained below with reference to FIGS. 4 and 5, thereby preventing a leakage of fluid or admission of dirt or other debris into side 13.

The first grommet 20 of FIG. 1 in particular may include a first sealing disc 22 having an outer surface 23 facing side 13 of the panel 12, e.g., an interior side of a vehicle passenger cabin, and also an inner surface 25 facing side 15 of the panel 12, for instance an underhood side of an engine compartment. The first grommet 20 includes a first conduit 24, which in turn defines an elongated first opening 26. The first conduit 24 extends from the outer surface 23 of the first sealing disc 22 toward side 13 of the panel 12. The first conduit 24 may be a shaped as a rectangular box as in the example embodiment shown in FIG. 1. As explained below, the first conduit 24 and the elongated first opening 26 are enlarged or "elongated" relative to a second conduit 34 of the second grommet 30. The elongated design is intended to help enable the wire bundle ($W_{12}$) to be divided into two or more smaller sub-bundles ($W_1$, $W_2$) on side 13 of the panel 12 so as to facilitate routing of electricity to different electrical components.

The second grommet 30 of FIG. 1 may include a second sealing disc 32 of the same or substantially the same diameter as the first sealing disc 22. The second sealing disc 32, which may be positioned on side 15, includes an outer surface 33 facing away from the first grommet 20 and an inner surface 35 facing the first grommet 20. When installed with respect to the panel 12, the inner surfaces 25 and 35 are immediately adjacent to each other and secured together via a latching operation of the annular retainer 50 as set forth below.

The second grommet 20 of FIG. 1 includes a second conduit 34 defining a second opening 36, with the second conduit 34 extending from the outer surface 33 toward and into side 15. The second conduit 34 may be a cylindrical tube with a circular cross-section as in the example embodiment shown in FIG. 1 so as to receive a generally cylindrical wire bundle ($W_{12}$). For instance, a conventional 30 mm wire bundle of a typical vehicle wiring harness may be received within the second conduit 34 and split into separate 15 mm wire bundles as the sub-bundles ($W_1$ and $W_2$) within the first conduit 24, with the elongated first opening 26 allowing sufficient space for the sub-bundles ($W_1$ and $W_2$) to be positioned side-by-side.

The cable guide 40 and the annular retainer 50 are encapsulated between the respective first and second grommets 20 and 30. The cable guide 40 may include an arcuate or semi-circular surface 45 defining an arcuately-shaped or semi-circular wire guide channel 40G. From the perspective of FIG. 1, in the installed position the end 41 of such a wire guide channel is visible within the second opening 36. End 43 of the cable guide 40 is visible at a distal end 27 of the first conduit 24, with end 43 positioned flush with the distal end 27 in the installed position. End 43 may include a radial foot or tab or other retention feature as shown to help prevent retraction of the cable guide 40 into the first conduit 24.

To facilitate assembly of the cable guide 40 and the annular retainer 50 into the first and second grommets 20 and 30 of FIG. 1, the respective first and second grommets 20 and 30 may be constructed from a suitably flexible and elastic material, e.g., ethylene propylene diene monomer (EDPM) rubber or another synthetic elastomer. For the level of flexibility and elasticity to be suitable for the various applications conceived herein, the first and second grommets 20 and 30 should be sufficiently stretchable so as to admit the cable guide 40 and the annular retainer 50 therein and return to a relaxed state when released, thereby retaining the cable guide 40 and the annular retainer 50. Additionally, the cable guide 40 is received and retained within the first conduit 24 by virtue of the geometry of the cable guide 40 and that of the first conduit 20, which surrounds the cable guide 40 and thus holds the cable guide 40 in place.

Referring to FIG. 2, the cable guide 40 and the annular retainer 50 are depicted as arranged in the installed position corresponding to FIG. 1. The cable guide 40 includes two portions, i.e., the wire guide channel 40G and a housing 40H, which may be separately formed and ultrasonically welded or bonded together, or which may be integrally formed. The wire guide channel 40G may be constructed as a semicircular chute as shown, such that the weight of any wire bundle ($W_{12}$, see FIG. 1) secured within the wire channel 40G is supported from underneath. The housing 40H may be constructed as a tube, e.g., a rectangular or box-shaped tube as shown, and is thus is enclosed on all sides other than at end 26 of the first conduit 24 shown in FIG. 1.

The annular retainer 50 of FIG. 2 includes an annular wall 51, i.e., forming a complete ring, and a plurality of axially-extending latch fingers 52. The axially-extending latch fingers 52 include interspaced, alternating axially-extending latch fingers 44A and 44B. The axially-extending latch fingers 44A may be embodied as flexible snap fingers, for instance having a U-shaped profile with a latch 48 such as a triangular tooth or foot as shown. The axially-extending latch fingers 44B may be embodied as rigid tabs likewise having a latch 49, which may be similarly or differently shaped relative to the latch 48 depending on the design.

Figure 4:
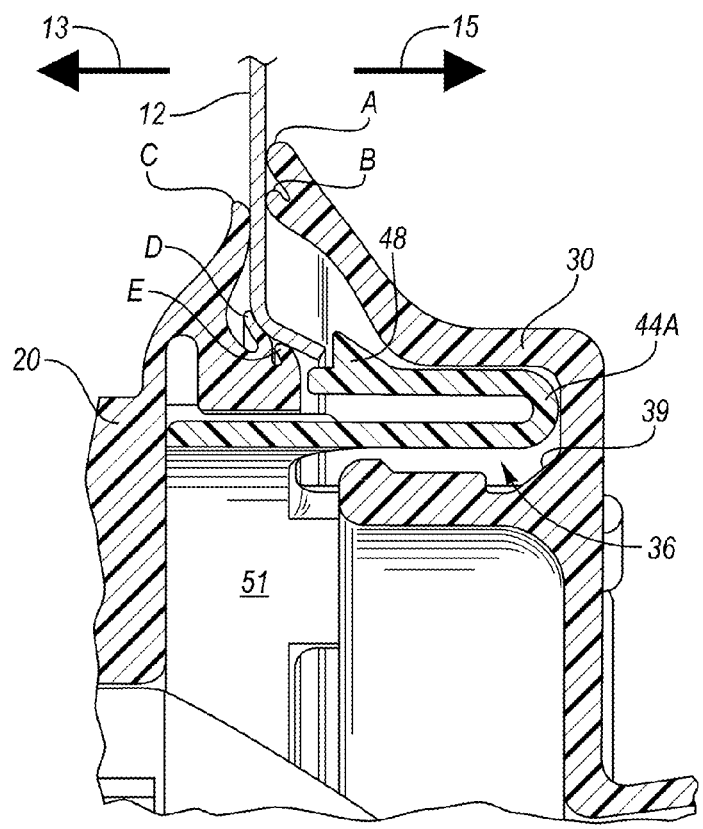
FIG. 4 is a schematic illustration of a portion of the annular retaining ring, panel, and first and second grommets depicting engagement with the panel of latching fingers of the annular retaining ring.

With respect to the center axis XX of the annular retainer 50, the latch 48 of the axially-extending latch fingers 44A are oriented so as to be radially-outwardly facing. This allows the latch fingers 44A to engage the panel 12 as shown in FIG. 4, i.e., to lock against a perimeter edge of any opening formed in the panel 12 for feeding the wire bundle ($W_{12}$ of FIG. 1A) through the panel 12. The latch 49 of each axially-extending latch finger 44B is, conversely, radially-inwardly facing and thus configured to latch the respective first and second grommets 20 and 30 to each other. In an example embodiment, a total of eight axially-extending latch fingers 44A and 44B may be used in equal numbers, with each latch finger 44A positioned between a pair of latch fingers 44B and vice versa, equally spaced, such that the radial orientation of the tabs 48 and 49 alternate around a perimeter of the annular wall 51.

Figure 3:
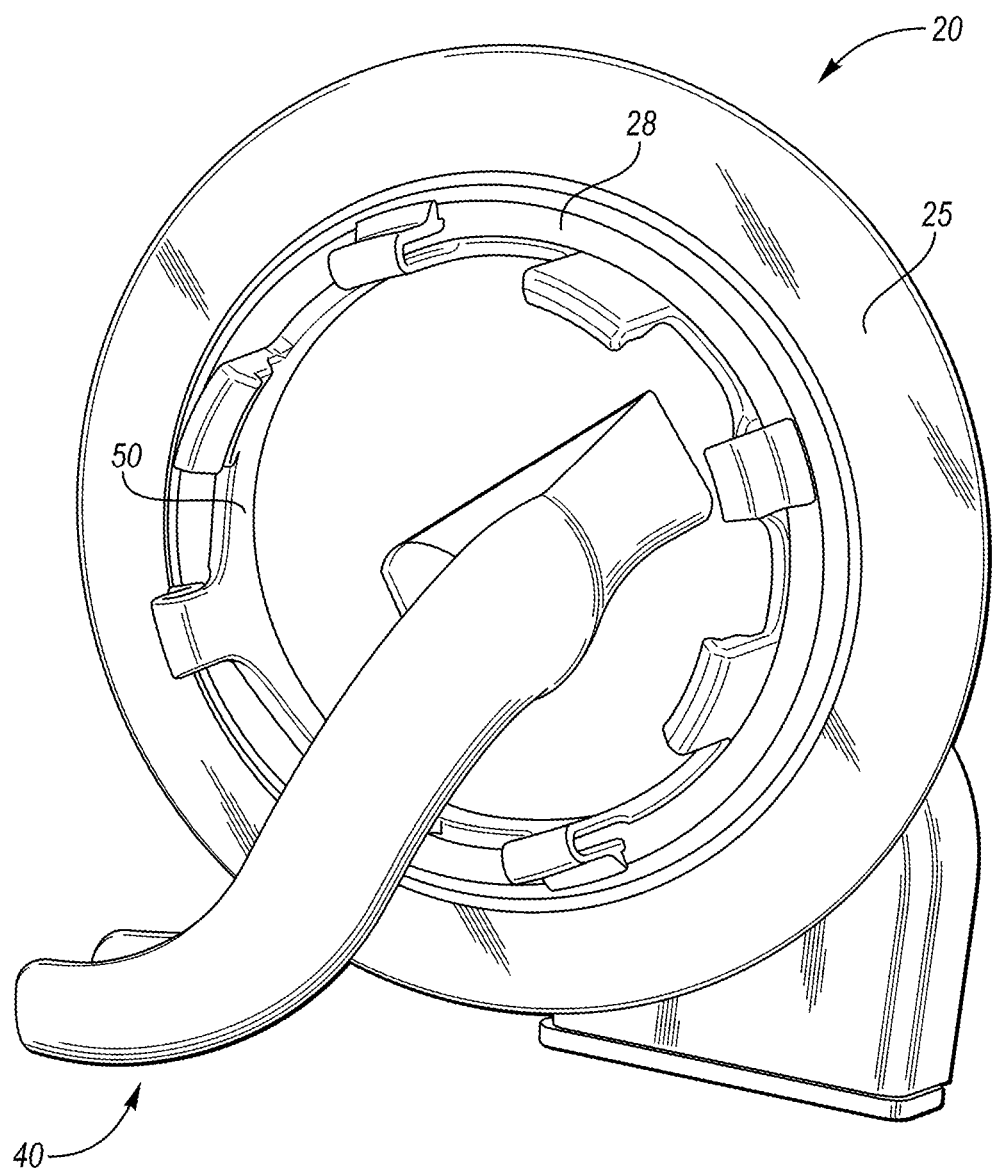
FIG. 3 is a schematic perspective view illustration of the structure of FIG. 2 when installed with respect to a first grommet.

Referring to FIG. 3, the cable guide 40 and the annular retainer 50 are shown installed with respect to the first grommet 20 such that the inner side 25 of the first grommet 20 is visible. First and second sets of sealing lips 28 and 38 are defined by the first and second sealing discs 22 and 32 of FIG. 1 as explained in further detail below with reference to FIG. 4, with only the first set of sealing lips 28 shown schematically in FIG. 3. The first set of sealing lips 28 may be formed on concentric circular projections 21 of the inner surface 25, with the concentric circular projections circumscribing the annular retainer 50. The second set of sealing lips 38, not shown in FIG. 3, may be similarly constructed with respect to the inner surface 35 of the second grommet 30. The first and second sets of sealing lips 28 and 38 may be formed of the same material as the first and second grommets 20, e.g., EDPM rubber, and thus are sufficiently compressible and waterproof when pressed against the panel 12.

Figure 5:
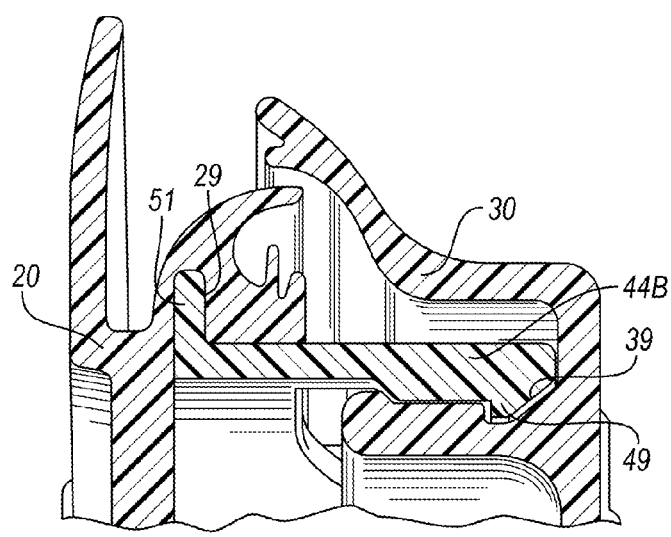
FIG. 5 is a schematic illustration of another portion of the annular retaining ring, panel, and first and second grommets depicting engagement of the first and second grommets with each other via the annular retaining ring.

The sealing and latching functions of the sealing grommet assembly 10 are described with particular reference to FIGS. 4 and 5. Because the sealing grommet assembly 10 has two sides, i.e., one side provided by the first grommet 20 acting on side 13 of the panel 12 and another side provided by the second grommet 30 acting on side 15 as best shown in FIG. 1A, more robust fluid and debris sealing is made possible relative to conventional grommets. For instance, in an example embodiment the sealing grommet assembly 10 may define, via the first and second sets of sealing lips 28 and 38, at least five different sealing surfaces, with the sealing surfaces indicated in FIG. 4 as sealing surfaces A, B, C, D, and E. Sealing surfaces A and B are provided by the compression of material of the second grommet 30, i.e., the second set of sealing lips 38, against the panel 12 on side 15. Sealing surfaces C, D, and E provided by the first set of sealing lips 28 are likewise provided by the compression of material of the first grommet 20 against the panel 12 on side 13. The sealing surfaces A, B, C, D, and E compress against the panel 12 when the first and second grommets 20 and 30 are latched together via the annular retainer 50, such that water, dirt, and other debris are prevented from passing from side 15 to side 13.

Also shown in FIG. 4 is the reception of the axially-extending latch fingers 44A within a mating recess 39 defined by an interior wall 38 of the second grommet 30. Engagement of the latch 48 with the panel 12 prevents axial retraction of the annular retainer 50 through the panel 12, and thus allows the axially-extending latch fingers 44A to act as flexible snap-type retainers. As a plurality of the latch fingers 44A are arranged around the perimeter of the axial wall 51 of the annular retainer 50, the first grommet 20 is secured to the panel 12 in multiple, equally-spaced locations around the perimeter of the annular retainer 50.

FIG. 5 depicts the retention of the first and second grommets 20 and 30 to each other via the axially-extending latch fingers 44B. As shown in FIGS. 2 and 3 and noted above, the latch fingers 44B include a latch 49. Unlike the latches 48 of FIG. 4 that are used to secure the first grommet 20 to the panel 12, the latches 49 are inwardly-facing so as to engage recess 39 in material of the second grommet 30. The second grommet 30 may be molded with the recess 39 to provide the recess 39 with a profile matching that of the latch 49 as shown. Therefore, when a given one of the axially-extending latch fingers 44B is inserted into a corresponding recess 39 of the second grommet 20, the latch 49 snaps into place and secures the first grommet 20 to the second grommet 30.

Also depicted in FIG. 5 is the retention of the annular retainer 50 along the annular wall 51 by the material of the first grommet 20, with the annular wall 51 retained within a recess or slot 29 defined by the first grommet. Such a configuration facilitates manual assembly by allowing the elastic material of the first grommet 20 to be stretched over the annular wall 51 and released, with the elasticity of the grist grommet 20 thereafter capturing the annular retainer 50.

The above-described sealing grommet assembly 10 may facilitate installation of a wire bundle of a typical wire harness with a limited packaging space, such between a congested engine compartment and a passenger compartment of a vehicle as noted above, between internal and external sides of a structural panel or building wall, or from one side of an appliance to another, e.g., a back panel of a refrigerator. For example, one of ordinary skill in the art, in view of the description of FIGS. 1-5, will appreciate that the disclosed structure enables a method of installing a wire bundle with respect to any panel using the sealing grommet assembly 10. For instance, the method may include feeding the wire bundle ($W_{12}$) of FIG. 1A into the cable guide 40, e.g., stretching the second grommet 30 over the cable guide 40 such that the wire bundle ($W_{12}$) is fed into and secured within the wire guide channel 40G and housing 40H of FIG. 2. The wire bundle ($W_{12}$) with cable guide 40 can thereafter be fed into the second grommet 30.

Next, the first grommet 20 and the annular retainer 50 may be inserted into the opening (arrow 17) of the panel 12 from a first side of the panel 12, e.g., from side 13. That is, the portion of the sealing grommet assembly 10 shown in FIG. 3, i.e., the portion having the first grommet 20, is inserted from side 13 of FIG. 1 into the opening (arrow 17) in the panel 12 and then snapped into place via operation of the axially-projecting flexible latch fingers 44A as depicted in FIG. 4. The annular retainer 50 and the first grommet 20 are thus secured via a first number of the plurality of axially-extending latch fingers 44, i.e., the latch fingers 44A. At this stage of assembly, the sealing grommet assembly 10 of FIG. 1 is installed on side 13 of the panel 12.

Next, the second grommet 30 can be slid into place from side 15 and secured to the first grommet 20 via latching operation of the axially-projecting latch fingers 44B shown in FIG. 5, which are a second number of the axially-extending latch fingers 44 within this example method. The first and second sets of sealing lips 28, 38, which are compressed via the latched first and second grommets 20 and 30, form a seal on both sides 13 and 15 of the panel 12.

In this manner, the sealing grommet assembly 10 can be installed with respect to a panel 12 with a plurality of seals ensuring water-tight and consistently positioned placement against the panel 12. The remainder of a wiring harness having the wire bundle ($W_{12}$) can then be attached to the walls or other suitable structure of the engine compartment, and the sub-bundles ($W_1$, $W_2$) can be electrically connected to the components on the interior side 15.

While the best modes for carrying out the present disclosure have been described in detail, those familiar with the art to which this disclosure relates will recognize various alternative designs and embodiments that fall within the scope of the appended claims.

The invention claimed is:

1. A sealing grommet assembly for use with a panel and a wire bundle, the sealing grommet assembly comprising:
  a first grommet defining a first conduit and a first set of sealing lips;
  a second grommet defining a second conduit and a second set of sealing lips;
  a cable guide, positioned within the first and second conduits, configured to receive and support the wire bundle; and
  an annular retainer encapsulated by the first and second grommets, and having a first set of axially-projecting latch fingers securing the first and second grommets to each other, and also having a second set of axially-projecting latch fingers securing the first and second grommets to the panel;
  wherein the first and second sets of sealing lips are configured to form a seal against opposite sides of the panel when the sealing grommet assembly is secured to the panel via the annular retainer.

2. The sealing grommet assembly of claim 1, wherein the first and second grommets are constructed of ethylene propylene diene monomer (EDPM) rubber.

3. The sealing grommet assembly of claim 1, wherein the cable guide is constructed of molded nylon or plastic.

4. The sealing grommet assembly of claim 1, wherein the first set of sealing lips includes three sealing lips and the second set of sealing lips includes two sealing lips.

5. The sealing grommet assembly of claim 1, wherein the cable guide includes a semicircular wire guide channel configured to receive the wire bundle and positioned within the second conduit, and wherein the second conduit is a cylindrical tube.

6. The sealing grommet assembly of claim 1, wherein the cable guide includes a rectangular housing configured to receive the wire bundle and positioned in the first conduit, and wherein the first conduit is a rectangular box.

7. The sealing grommet assembly of claim 1, wherein the first set axially-projecting latch fingers include radially-extending latches, and wherein the second grommet defines a plurality of recesses each of which receives one of the radially-extending latches.

8. The sealing grommet assembly of claim 7, wherein each latch finger of the first set axially-projecting latch fingers has a U-shaped profile.

9. The sealing grommet assembly of claim 1, wherein each latch finger of the second set axially-projecting latch fingers includes a radially-extending latch that engages the panel.

10. The sealing grommet assembly of claim 1, wherein the first and second sets of axially-projecting latch fingers latch fingers are alternatively and equally spaced around a perimeter of the annular retaining ring.

* * * * *